United States Patent Office 3,118,949
Patented Jan. 21, 1964

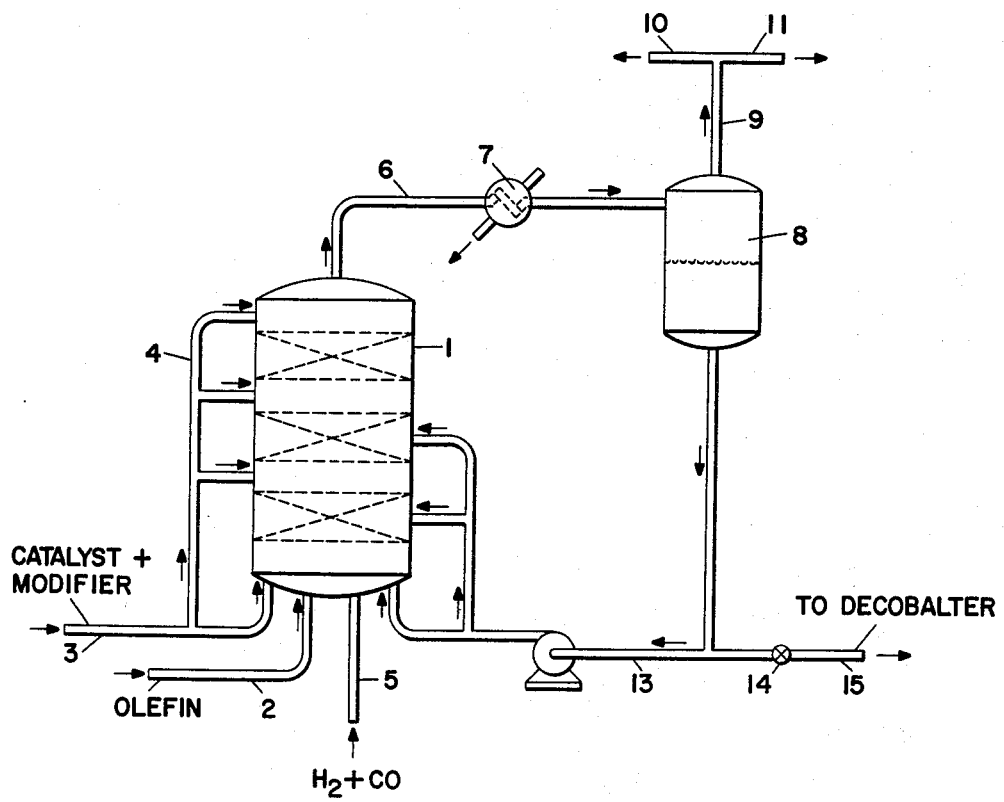

3,118,949
PREPARATION OF DIMERIC OXYGENATED COMPOUNDS
Neville Leverne Cull, Baker, and Clyde Lee Aldridge, Baton Rouge, La., assignors to Esso Research and Engineering Company, a corporation of Delaware
Filed Aug. 6, 1958, Ser. No. 753,552
11 Claims. (Cl. 260—604)

The present invention relates to the preparation of oxygenated organic compounds by the reaction of olefins with hydrogen and carbon monoxide in the presence of a carbonylation catalyst. More specifically, the present invention relates to a novel process for producing high molecular weight alcohols containing two more carbon atoms than twice the number in the olefin feed.

It is well known in the art that oxygenated organic compounds may be synthesized from organic compounds containing olefinic linkages by a reaction with carbon monoxide and hydrogen in the presence of catalyst containing metals of the iron group in a two-stage process in which predominantly aldehydes and minor proportions of ketones and alcohols are formed in a first step in the presence of a carbonylation catalyst comprising metals of the iron group and particularly cobalt, and the products from the first step may then be hydrogenated with hydrogen gas in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as supported or unsupported nickel, copper chromite, sulfactive catalysts such as oxides and sulfides of tungsten, nickel and molybdenum and the like. A hydrogenation temperature of 200–500° F. is usually preferred.

The carbonylation or oxo reaction provides a particularly attractive method of preparing primary alcohols to supply the large market for plasticizers, detergents, solvents and the like. Amenable to the reaction to a greater or less degree are long and short chained olefinic compounds, not only hydrocarbons but most other organic compounds having a carbon-to-carbon olefinic linkage such as unsaturated alcohols, acids, esters and the like. Straight and branch-chained olefins such as propylene, butene, pentene, hexene, heptene, styrene, olefin polymers such as di- and tri-isobutylene, hexene and heptene dimers, polypropylenes, olefinic fractions from the hydrocarbon synthesis process, thermal or catalytic cracking operations and other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 5 volumes hydrogen per volume of carbon monoxide. The conditions for reacting olefins with the synthesis gases vary somewhat in accordance with the nature of the olefin feed, the reaction being generally conducted at pressures in the range of from about 1000 to 7500 p.s.i.g. and the ratio of synthesis gas to olefin may vary widely; in general, about 2500 to 25,000 cubic feet of $H_2$+CO per barrel of olefin feed are employed.

The catalyst for the first stage of the process may be employed in the form of an oil-soluble compound of the catalytically active carbonylation metal. Thus there have been employed the salts of the metals such as cobalt and high molecular weight fatty acids such as stearic, oleic, naphthenic linoleic and the like. Water soluble catalysts, such as cobalt acetate, chloride, and the like, have also been successfully employed. Catalyst concentrations in the conventional oxo reaction may vary from about 0.05 to 5.0% by weight of the catalyst salt calculated as cobalt based on the olefinic feed. The first stage or carbonylation reaction is generally carried out at temperatures in the range of from about 250° to 450° F. depending upon the nature of the olefin and other reaction conditions. In general, the lower olefins will react at lower temperatures and react to a greater extent than the high molecular weight olefins. The carbonylation reaction is an exothermic one with a high heat release and careful temperature control is required in the reaction zone to prevent complete decompsition of cobalt carbonyl to metallic cobalt and also to prevent formation of secondary reaction products and undesired reactions, such as hydrogenation of the olefin, formation of hydrocarbon synthesis product, and the like.

If desired, the crude aldehydic product is freed of metal contaminants by any of the known so-called decobalting or demetaling procedures. While heat soaking at temperatures of, for example, 200–500° F. will effect the removal of metal contaminants from the aldehydic product, other techniques may be employed. These include the use of water or an inert stripping gas at the aforesaid temperatures. Another alternative procedure for demetaling the crude aldehydic product is to contact it with an aqueous solution of a low molecular weight organic acid to produce the metal salt of the organic acid which is easily separated from the aldehydic product. Pressures of from atmospheric to 1,000 p.s.i.g. are suitable for these demetaling processes.

Versatile as the oxo reaction is in the production of alcohols from olefins, the unmodified process has not proved itself adaptable to the preparation in good yields of high molecular weight alcohols. These compounds are of particular importance commercially in the manufacture of detergents and a multitude of other purposes. It has been found that, as the molecular weight of the olefin increases, the conversion to the aldehyde falls off rapidly and, with olefins above about 12 carbon atoms, reaction rates are too slow and yield too low for a commercially feasible operation. This rate and yield decrease with increasing molecular weight of olefin is particularly evident in the case of highly branched olefins, such as those prepared by polymerizing low molecular weight olefins, i.e., the polymers and copolymers of propylene, butylenes and amylenes.

It is, therefore, a purpose of the present invention to disclose a novel process of producing substantial yields of high molecular weight primary alcohols by the oxo or carbonylation reaction.

It is a further purpose of the present invention to produce these high molecular weight dimer alcohols from olefins having a substantially lower molecular weight, which olefins are in considerable larger supply than high molecular weight olefins, with little or no decrease in total alcohol yield.

Other and further purposes and objects of the present invention will become more apparent hereinafter.

It has hitherto been found that accompanying the main carbonylation reaction, i.e. the reaction wherein an olefin is converted to an aldehyde having one more carbon atom, there is formed a large number of secondary reaction products, such as esters, aldols, polymers, ketones and the like. It has now been found that by addition of the reaction modifier of this invention there is formed, in good yields, a primary aldehyde and after hydrogenation a primary alcohol produce having $2n+2$ carbon atoms, where an olefin with $n$ carbon atoms is passed to the carbonylation zone. Accompanying this reaction is the normal aldehyde synthesis reaction producing aldehydes and alcohols having $n+1$ carbon atoms. The normal reaction product is formed to a substantially smaller extent than in the absence of the reaction modifier.

In the more recent prior art, it has been found that zinc containing compounds may be employed in the oxo reaction zone to modify the reactant and to form higher molecular weight oxygenated products which will be referred to herein as dimer aldehydes and dimer alcohols. Save for the modifier, the oxo process referred to employs conventional conditions. By the use of zinc, for example, a $C_7$ olefin feedstock can be converted into a mixture of $C_8$ monomer primary alcohols and $C_{16}$ dimer primary alcohols.

It has now been found that in the oxo reaction under the conventional conditions recited above oil-soluble cadmium and mercury compounds when employed as a modifier in a specific ratio of cobalt to modifier will effect exceptionally high yields of dimer product. It has been found that there exists a critical lower limit with regard to the effective concentrations of cadmium and mercury compounds and further that there exists a critical minimum ratio of cobalt catalyst to modifier.

Modifiers or additives of the instant invention are the oil-soluble compounds or complexes of cadmium and mercury. By the term "oil soluble," it is meant to include all compounds which are soluble in a liquid that is not miscible with water. More particularly, the term "oil soluble" as employed herein will mean those compounds which are soluble in such oils as olefinic, paraffinic and aromatic hydrocarbons. The more common oil-soluble compounds contemplated are typified by the cadmium and mercury salts of higher molecular weight acids, e.g. oleic, stearic, naphthenic, linoleic and the like complexes with di-ketones such as mercury or cadmium, acetylacetonate, as well as the alcoholates of the fatty alcohols. In general, any cadmium or mercury compound containing an anionic component which renders the compound soluble in olefin, paraffin or aromatic hydrocarbons is suitable.

As previously noted, the process of the present invention is conventional save for the use of modifiers mentioned above in certain critical proportions and in certain critical ratios to the cobalt catalyst. The particular manner in which the reaction modifier is added is of no consequence. For example, it may be added in a solution of hydrocarbon together with a cobalt catalyst or it may be added separately. It may be added with the olefinic feed or with any hydrocarbon solvent employed in the reaction. The action affected by the modifiers employed is brought about by contact of the oil soluble cadmium or mercury compounds with the olefinic feed in the presence of the cobalt catalyst under reaction conditions previously noted regardless of how the catalyst and/or modifier are added. The modifier of this invention when utilized with an otherwise conventional amount of cobalt catalyst effects very slight increases in the dimer product yield and as higher concentrations of modifier are employed, the overall yield decreases sharply due to a sharp drop in the overall oxo conversion. It has been found, however, that if the concentration of the oxo catalyst is raised to effect a minimum cobalt to cadmium or mercury ratio of at least 2 to 1, with at least about .01 mole of modifier/liter of olefinic compound markedly increased yields of dimer product in the order of that obtained with zinc result. The temperature and pressure as long as they are kept within the conventional ranges do not seriously affect the dimer product yield. As with the zinc modified oxo process, the lower olefins such as ethylene, propylene, butylene and the like to produce respectively $C_6$, $C_8$ and $C_{10}$ oxygenated products require less severe operating conditions, e.g. lower temperatures. Higher molecular weight olefins such as $C_{12}$ and higher require the higher temperatures.

The present invention will best be understood from the more detailed description hereinafter, wherein reference will be made to the accompanying drawing which is a schematic illustration for a system suitable for carrying out a preferred embodiment of the invention. It is to be understood that the type of equipment referred to and described is merely illustrative and that there exist many other types of apparatus equally suitable for the present process.

Referring now to the drawing, an olefinic hydrocarbon is fed through line 2 to the bottom of primary reactor 1. The latter comprises a reaction vessel preferably divided into discrete zones separated by trays and free space. The reactor is preferably packed with inert solids to facilitate gas-liquid contact.

Also passed into reactor 1 are cobalt carbonylation catalyst and the cadmium or mercury metal reaction modifier. In a preferred modification, a mixture of cobalt and reaction modifier is employed dissolved in the olefin feed and is admitted through line 2. It is to be understood that other forms of cobalt, such as an aqueous solution of a cobalt salt, i.e., cobalt acetate, or a slurry of oil-insoluble cobalt solids, such as cobalt oxide, metal, carbonate and the like, may be employed. Cobalt must be added in an amount of .03 to .20 moles per liter of olefin and modifier is added to the extent of .01 to .04 mole per liter. A mole ratio of cobalt to modifier of about 3:1 to 4.7:1 with cadmium modifiers and about 2:1 to 3:1 with mercury modifiers is desirable for the production of dimer product in good yields without a deleterious effect on the overall conversion. No substantial improvement is obtained by raising these ratios to over 7:1.

Simultaneously, a gas mixture containing $H_2$ and CO in the approximate ratio of 0.5 to 2 volumes $H_2$ per mole CO is supplied through line 5 and flow concurrently with the olefinic and aldehyde product upwardly through reactor 1. The latter is preferably operated at pressures of about 2500–3500 p.s.i.g. and temperatures of 200 to 400° F.

Liquid oxygenated reaction products comprising aldehydes are withdrawn from the upper portion of reactor 1 through line 6. The product, which is at a temperature of about 250 to 450° F., is then passed to cooler 7, where the temperature is lowered to about 60 to 120° F., and then passed to high pressure gas-liquid separator 8. Herein separation of unreacted gases from liquid product occurs. The unreacted gases may be withdrawn through line 9, and after scrubbing, may be recycled to the system via line 10 or in part purged. Liquid aldehyde product containing high concentration of cobalt carbonyl is withdrawn from high pressure separator 8 through line 12. A portion of this stream is preferably passed via line 13 to aldehyde synthesis reactor 1 to supply both cooling and a portion of the catalyst requirements of that vessel; the amount of product recycled being a function of the amount of cooling required in the reactor. The recycled liquid is preferably added along the length of reactor 1. Other means for cooling may be employed if desired.

Liquid aldehyde product not recycled to reactor 1 is passed through pressure release valve 14 and line 15. This material, containing dissolved cobalt carbonyl and modifier residue is sent to a catalyst decomposition or decobalting zone, where in the presence of heat and steam, water, or dilute organic acid, the metal contaminants may be removed from the aldehyde product. This step may be omitted if desired. The metal compounds may be decomposed by direct or indirect heating, e.g., steam, etc., or be made insoluble in the organic mixture by treatment with a low molecular weight organic acid such as acetic, oxalic, etc. Various demetalizing techniques are known and in this invention any one may be employed.

The aldehyde product, substantially completely free of inorganic compounds, is then catalytically hydrogenated under conventional conditions to alcohols and the alcohol product fractionated to produce both the $n+1$ and the $2n+2$ alcohols, as described.

The process of the present invention may be further illustrated by the following specific examples. Example 1 shows an oxonation process modified by ineffectual amounts of cadmium oleate. Examples 2 and 3 show the effect of increasing the amount of modifier and maintaining a high ratio of cobalt to modifier in the reaction mixture.

EXAMPLE 1

700 grams of $C_7$ olefin were oxonated with .033 mole/liter of cobalt (as cobalt oleate) and .007 mole/liter cadmium (as cadmium oleate) for six hours at 350° F. and 3,000 p.s.i.g. synthesis gas ($H_2$/CO 1.2/1.0). After thermally decobalting for two hours at 350° F. under 800 p.s.i.g. $H_2$, the decobalted product was hydrogenated for six hours at 350° F., 3,000 p.s.i.g. methanized hydrogen over 120 cc. of Harshaw nickel catalyst.

The hydrogenated product was filtered and distilled in a one-inch 30 plate Oldershaw. The hydrocarbon was removed at atmospheric pressure of 2/1 reflux ratio. The distillation was continued at 20 mm. Hg using a 5/1 reflux ratio. Distillation data are summarized below.

|  | Cut Points, °F. | Pressure, mm. | Wt. percent |
|---|---|---|---|
| Hydrocarbon [1] | Initial–265 | Atmospheric. | 14.3 |
| $C_8$ Alcohol | Initial–225 | 20 | 65.5 |
| Intermediate | 225–330 | 20 | 5.3 |
| $C_{16}$ Alcohol | 330–360 | 20 | 2.7 |
| Bottoms | 360+ | 20 | 11.0 |
|  |  |  | 98.8 |

[1] Includes about 4% hydrocarbon displaced from the hydrogenation catalyst.

It will be seen that conventional amounts of cobalt oleate, i.e., .033, and .007 mole of cadmium containing modifier are ineffective for the purpose of producing substantial amounts of dimer product.

EXAMPLE 2 (RUN IH 5567–B)

A run similar to the above was made except that the catalyst system consisted of 0.022 mole of cadmium oleate and 0.055 mole of cobalt oleate. The distribution of the product was as follows.

Wt., percent
Hydrocarbon (4% from hydro cat) _____ 53.0
$C_8$ alcohol _____ 19.5
Intermediate _____ 3.5
$C_{16}$ _____ 12.0
Bottoms _____ 12.0

It will be noted from this example that by increasing the amount of modifier and the ratio of cobalt to modifier, improved results are obtained although the amount of dimer product in the mixture is considerably less than the potential for this modifier as will be shown from the subsequent example.

EXAMPLE 3

A run similar to Example 1 was made except that the catalyst system consisted of 0.022 mole of cadmium stearate and 0.077 mole of cobalt.

In this example the product contained 26 mole percent $C_{16}$ dimer alcohol with a high oxo conversion.

EXAMPLE 4

A run similar to Example 1 was made except that the catalyst consisted of .012 mole of cadmium acetate and .022 mole of cobalt acetate.

The density of the product of .71 g./cc. as compared to the density of the feed of .70 showed that the oxo conversion was nil.

EXAMPLE 5

A run similar to Example 1 was made except that the catalyst system consisted of 0.022 mole of mercuric stearate and 0.033 mole of cobalt oleate. The product comprised the following:

Wt., percent
Hydrocarbon (including 4% displaced from the catalyst) _____ 45.4
$C_8$ alcohol _____ 29.5
Intermediate _____ 3.0
$C_{16}$ _____ 13.4
Bottoms _____ 7.7

The results from Examples 1, 2, 4 and 5 are tabulated below in comparison with two blank oxo runs under the same conditions.

Table I

|  | Yields in Weight, Percent |  |  |  |  |  |
|---|---|---|---|---|---|---|
| Catalyst Additive | None | None | Cd(Oleate)$_2$ | Cd(Oleate)$_2$ | Cd(Acetate)$_2$ | Hg(Stearate)$_2$ |
| Moles cobalt | .033 | .033 | .033 | .055 | .022 | .033 |
| Moles metal additive |  |  | .007 | .022 | .012 | .022 |
| Hydrocarbon,[1] Initial–345° (atm.) | 18 | 22.5 | 14.3 | 53 | 90 | 45.4 |
| $C_8$ Alcohol, Initial–210° F. (20 mm.) | 62 | 64 | 65.5 | 19.5 |  | 29. |
| Intermediate, 210–330° F. (20 mm.) | 6 | 5.5 | 5.3 | 3.5 |  | 3.0 |
| $C_{16}$ Alcohol, 330–360° F. (20 mm.) | 2 | 2.5 | 2.7 | 12.0 |  | 13.4 |
| Bottoms | 12 | 5.5 | 11.0 | 12.0 |  | 7.7 |

[1] Includes about 4% hydrocarbon displaced from the hydrogenation catalyst.

To determine more accurately the effect of varying the amount of modifier employed, reference may be had to Table II which sets forth several experiments varying the amounts of modifier and holding the cobalt concentration constant. Conversion, selectivities and yield are shown. These tests were carried out under the conditions of Example 1.

Table II

| Additive | Run No. | Moles/l. Cobalt | M/l. Additive | Conversion, Mole Percent | Selectivities, Mole Percent | | | Yield, Mole Percent $C_{16}$ Alc. |
|---|---|---|---|---|---|---|---|---|
|  |  |  |  |  | $C_8$ Alc. | $C_{16}$ Alc. | Bottoms |  |
| Cd(Oleate)$_2$ | 5457–C | .033 | .007 | 86.7 | 74.6 | 4.5 | 11.0 | 3.9 |
| Cd(Stearate)$_2$ | 5817–C | .033 | .011 | 83.5 | 69.4 | 11.7 | 11.2 | 9.8 |
| Cd(Oleate)$_2$ | 5819–C | .033 | .011 | 85.7 | 68.8 | 12.3 | 10.8 | 10.5 |
| Cd(Oleate)$_2$ | 5759–C | .033 | .022 | 9.4 | 43.0 |  |  | 3.8 |

The above runs show an increase in the mole percent dimer product as being directly proportional to an increase in the amount of modifier employed; however, the overall yield of dimer product decreases sharply at above about .01 mole per liter modifier in combination with conventional amounts of cobalt catalyst, i.e. .033 mole per liter. In the fourth run increasing the modifier to .022 mole per liter without increasing the cobalt concentration resulted in a sharp drop in conversion.

Table III which follows represents a series of experiments wherein the modifier was added in a constant amount and the cobalt catalyst concentrations were increased.

Table III

| Additive | Run No. | Moles/l. Cobalt | M/l. Additive | Conversion, Mole Percent | Selectivities, Mole Percent | | | Yield Mole Percent $C_{16}$ Alc. |
|---|---|---|---|---|---|---|---|---|
| | | | | | $C_8$ Alc. | $C_{16}$ Alc. | Bottoms | |
| $Cd(Oleate)_2$ | 5759-C | .033 | .022 | 9.4 | 43.0 | Ca. 40.7 | | 3.8 |
| $Cd(Oleate)_2$ | 5567-B | .055 | .022 | 40.8 | 46.6 | 30.6 | 13.6 | 12.5 |
| $Cd(Oleate)_2$ | 5761-C | .066 | .022 | 85.0 | 71.0 | 16.6 | 7.6 | 14.1 |
| $Cd(Stearate)_2$ | 5630-C | .077 | .022 | 84.8 | 55.5 | 30.7 | 8.7 | 26.0 |

It will be seen from Table III that a molar ratio of at least 2:1 and preferably at least 3:1 is necessary in order to obtain exceptionally high yields of the dimer product. For example, at a 3:1 ratio of cobalt to cadmium, a fair yield of 14.1 mole percent of $C_{16}$ alcohol was obtained. An increase in the ratio of 3½:1 resulted in almost a two-fold increase in the dimer alcohol yield without substantial reduction of the overall conversion.

As evidenced by Table IV which follows, the optimum ratio of mercury modifier is about 2.5:1 with a lower critical minimum of about 0.1 mole. The preferred ratio for mercury is at least 2:1 as contrasted with the preferred ratio of 3:1 for cadmium.

Table IV

| Additive | Run No. | Moles Cobalt/l. | Mole/l. Additive | Conversion, Mole Percent | Selectivities, Mole Percent | | | Yield, Mole Percent $C_{16}$ Alc. |
|---|---|---|---|---|---|---|---|---|
| | | | | | $C_8$ Alc. | $C_{16}$ Alc. | Bottoms | |
| $Hg(St^1)_2$ | 5765-C | .033 | .011 | 81.8 | 74.5 | 10.8 | 8.5 | 8.8 |
| $Hg(St)_2$ | 5618-C | .033 | .022 | 48.5 | 57.5 | 27.6 | 9.5 | 13.3 |
| $Hg(St)_2$ | 5643-B | .055 | .022 | 61.1 | 60.0 | 25.1 | 9.0 | 15.3 |
| $Hg(St)_2$ | 5647-B | .077 | .022 | 68.0 | 80.8 | 3.4 | 6.3 | 2.3 |

[1] Stearate.

What is claimed is:

1. In a process for the preparation of oxygenated compounds having $2n+2$ carbon atoms wherein an olefinic compound having $n$ carbon atoms, $n$ being an integer of 3 to 12, is reacted in a reaction zone with carbon monoxide and hydrogen under oxonation temperatures and pressures in the presence of a cobalt-containing catalyst, the improvement which comprises maintaining in said reaction zone a modifier comprising an oil soluble metal salt of a higher molecular weight fatty acid, said metal being selected from the group consisting of cadmium and mercury, wherein said modifier is maintained in an amount of at least about .01 mole per liter of olefin and the mole ratio of cobalt catalyst to modifier is about 2:1 to 7:1.

2. A process in accordance with claim 1 wherein said modifier is a cadmium salt of a higher molecular weight fatty acid and wherein said molar ratio of cobalt to cadmium compound is from about 3:1 to 4.7:1.

3. A process in accordance with claim 1 wherein said modifier is a mercury salt of a higher molecular weight fatty acid and wherein said molar ratio of cobalt to mercury compound is about 2:1 to 3:1.

4. A process in accordance with claim 3 wherein said mercury salt is present in an amount of about 2.5:1.

5. In a process for the preparation of oxygenated compounds having $2n+2$ carbon atoms wherein an olefinic compound having $n$ carbon atoms, $n$ being an integer of 3 to 12, is reacted in a reaction zone with carbon monoxide and hydrogen under oxonation temperatures and pressures in the presence of a cobalt-containing catalyst, the improvement which comprises maintaining in said reaction zone a modifier comprising an oil soluble cadmium salt of a higher molecular weight fatty acid wherein said modifier is maintained in an amount of at least about .01 mole per liter of olefin and the mole ratio of cobalt catalyst to modifier is about 3.5:1.

6. A process for producing a mixture of primary alcohols having $n+1$ carbon atoms and $2n+2$ carbon atoms from an olefinic feed having $n$ carbon atoms, $n$ being an integer of 3 to 12, which comprises reacting said olefinic feed with carbon monoxide and hydrogen at elevated temperatures and pressures in the presence of a cobalt-containing catalyst and a modifier comprising an oil soluble metal salt of a higher molecular weight fatty acid, said metal being selected from the group consisting of cadmium and mercury, to produce a mixture of oxygenated compounds, said modifier being maintained in an amount from .01 to .04 mole per liter feed and said cobalt-containing catalyst being present in an amount from .03 to .2 mole per liter feed, the mole ratio of cobalt catalyst to the modifier being about 2:1 to 4.7:1, and hydrogenating said mixture of oxygenated compounds to produce the said mixture of primary alcohols having $n+1$ and $2n+2$ carbon atoms.

7. A process in accordance with claim 6 wherein said modifier is a cadmium salt of a higher molecular weight fatty acid.

8. A process in accordance with claim 7 wherein said cadmium salt is cadmium oleate.

9. A process in accordance with claim 7 wherein said cadmium salt is cadmium stearate.

10. A process in accordance with claim 6 wherein said modifier is mercury stearate.

11. In a process for the preparation of a $C_{16}$ primary alcohol wherein a $C_7$ olefin compound is reacted in a reaction zone with carbon monoxide and hydrogen under oxonation temperatures and pressures and in the presence of a cobalt-containing catalyst to produce a crude reaction product containing aldehydes and said reaction product is subsequently hydrogenated to yield said alcohol, the improvement which comprises maintaining in said reaction zone a modifier comprising an oil soluble metal salt of a higher molecular weight fatty acid, said metal being selected from the group consisting of cadmium and mercury, wherein said modifier is maintained in an amount of about .01 to .04 mole per liter of $C_7$ olefin and the mole ratio of cobalt catalyst to modifier is about 2.5:1 to 3.5:1.

References Cited in the file of this patent

UNITED STATES PATENTS 2,576,113    Hagemeyer    Nov. 27, 1951
2,811,567    Mason    Oct. 29, 1957